US011990700B2

(12) United States Patent
Sekino

(10) Patent No.: US 11,990,700 B2
(45) Date of Patent: May 21, 2024

(54) CONNECTOR WITH FRONT MASK

(71) Applicant: Yazaki Corporation, Tokyo (JP)

(72) Inventor: Tetsuya Sekino, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 24 days.

(21) Appl. No.: 17/700,647

(22) Filed: Mar. 22, 2022

(65) Prior Publication Data

US 2022/0344859 A1 Oct. 27, 2022

(30) Foreign Application Priority Data

Apr. 23, 2021 (JP) ................................. 2021-073018

(51) Int. Cl.
*H01R 13/436* (2006.01)
*H01R 13/506* (2006.01)

(52) U.S. Cl.
CPC ....... *H01R 13/4365* (2013.01); *H01R 13/506* (2013.01)

(58) Field of Classification Search
CPC ............ H01R 13/4362; H01R 13/4361; H01R 13/502; H01R 13/506; H01R 13/42
See application file for complete search history.

(56) References Cited

U.S. PATENT DOCUMENTS

2015/0340793 A1* 11/2015 Kutsuna ............. H01R 13/4362 439/733.1

FOREIGN PATENT DOCUMENTS

JP 2011-3299 A 1/2011
JP 2020-087811 A 6/2020

* cited by examiner

*Primary Examiner* — Renee S Luebke
*Assistant Examiner* — Paul D Baillargeon
(74) *Attorney, Agent, or Firm* — Sughrue Mion, PLLC

(57) ABSTRACT

A connector comprises a housing including a terminal accommodating chamber; and a front mask to cover a front side of the housing in a terminal inserting direction, wherein the housing includes a housing main body and an engagement frame section, wherein the engagement frame section protrudes forward from the housing main body, wherein the front mask includes a mask main body and an inserted section, the mask main body being provided with an accommodating recess in a position of the mask main body facing the terminal accommodating chamber, wherein the inserted section is inserted inside the engagement frame section, and wherein in a state in which the inserted section is inserted inside the engagement frame section and the accommodating recess is located in a position facing the terminal accommodating chamber, a portion of the inserted section protrudes from the engagement frame section and is exposed.

8 Claims, 5 Drawing Sheets

CONNECTOR WITH FRONT MASK

BACKGROUND OF THE INVENTION

Technical Field

The present invention relates to a connector.

Background Art

Conventionally, a connector is disclosed which includes a housing with a plurality of terminal accommodating chambers and an inner connector accommodating chamber, a front mask to be mounted to the housing for covering its front side, a plurality of terminals to be accommodated in the terminal accommodating chambers formed in the housing, and a data communication connector as an inner connector to be accommodated in the inner connector accommodating chamber formed in the housing (see e.g. Patent Document 1).

The housing includes a housing main body with the plurality of terminal accommodating chambers and the inner connector accommodating chamber, a pair of right and left protruding lateral walls protruding forward from the housing main body, and a plurality of upper protruding walls protruding forward from the housing main body, the upper protruding walls having insertion holes in their tips. The pair of protruding lateral walls has a pair of sliding grooves formed in their inner surfaces.

The front mask includes a front main body with terminal introduction openings and a connector insertion hole, the terminal introduction openings being located in positions each corresponding to one of the terminal accommodating chambers, and the connector insertion hole being located in a position corresponding to the inner connector accommodating chamber, wherein the front mask further includes sliding engagement claws and convex walls, wherein the sliding engagement claws protrude from the front main body and are inserted into the sliding grooves in the housing, wherein the convex walls protrude upward from the front main body and are inserted into the insertion holes in the housing.

For assembling such a conventional connector, the sliding engagement claws of the front mask are inserted into the sliding grooves in the housing and then slid, the convex walls of the front mask are inserted into the insertion holes in the housing, and the front mask is positioned in a correct position of the housing. Subsequently, the inner connector is accommodated in the inner connector accommodating chamber and the terminals are accommodated in the terminal accommodating chambers to assemble the connector.

CITATION LIST

Patent Literature

Patent Document 1: JP 2020-087811 A

SUMMARY OF THE INVENTION

However, in the conventional connector according to the Patent Document 1, when the front mask is not positioned in the correct position of the housing, a tip of an inserted member such as the inner connector and/or the terminal may come into contact with a circumferential edge of the connector insertion hole and/or terminal introduction opening at the time of inserting the inserted member into the housing by an operator, so that the inserted member may not be inserted into the front mask in a predetermined position. In this case, it is necessary to reassemble the front mask to the housing and to reinsert the inserted member by the operator, so that operability for assembling may not be good.

The present invention provides a connector which may enable the operability for assembling.

In order to achieve this objective, an aspect of the present invention provides a connector including: a housing including a terminal accommodating chamber for inserting a terminal therein; and a front mask configured to cover a front side of the housing in a terminal inserting direction along which the terminal is inserted into the housing, wherein the housing includes a housing main body and an engagement frame section, the housing main body including the terminal accommodating chamber, wherein the engagement frame section protrudes forward from the housing main body, wherein the front mask includes a mask main body and an inserted section, the mask main body being provided with an accommodating recess in a position of the mask main body facing the terminal accommodating chamber, wherein the inserted section is configured to be inserted inside the engagement frame section, and wherein in a state in which the inserted section is inserted inside the engagement frame section and the accommodating recess is located in a position facing the terminal accommodating chamber, a portion of the inserted section protrudes from the engagement frame section and is exposed.

The present invention may enable the operability for assembling to be improved.

DETAILED DESCRIPTION OF THE PREFERRED EMBODIMENTS

First Embodiment

Figure 1:
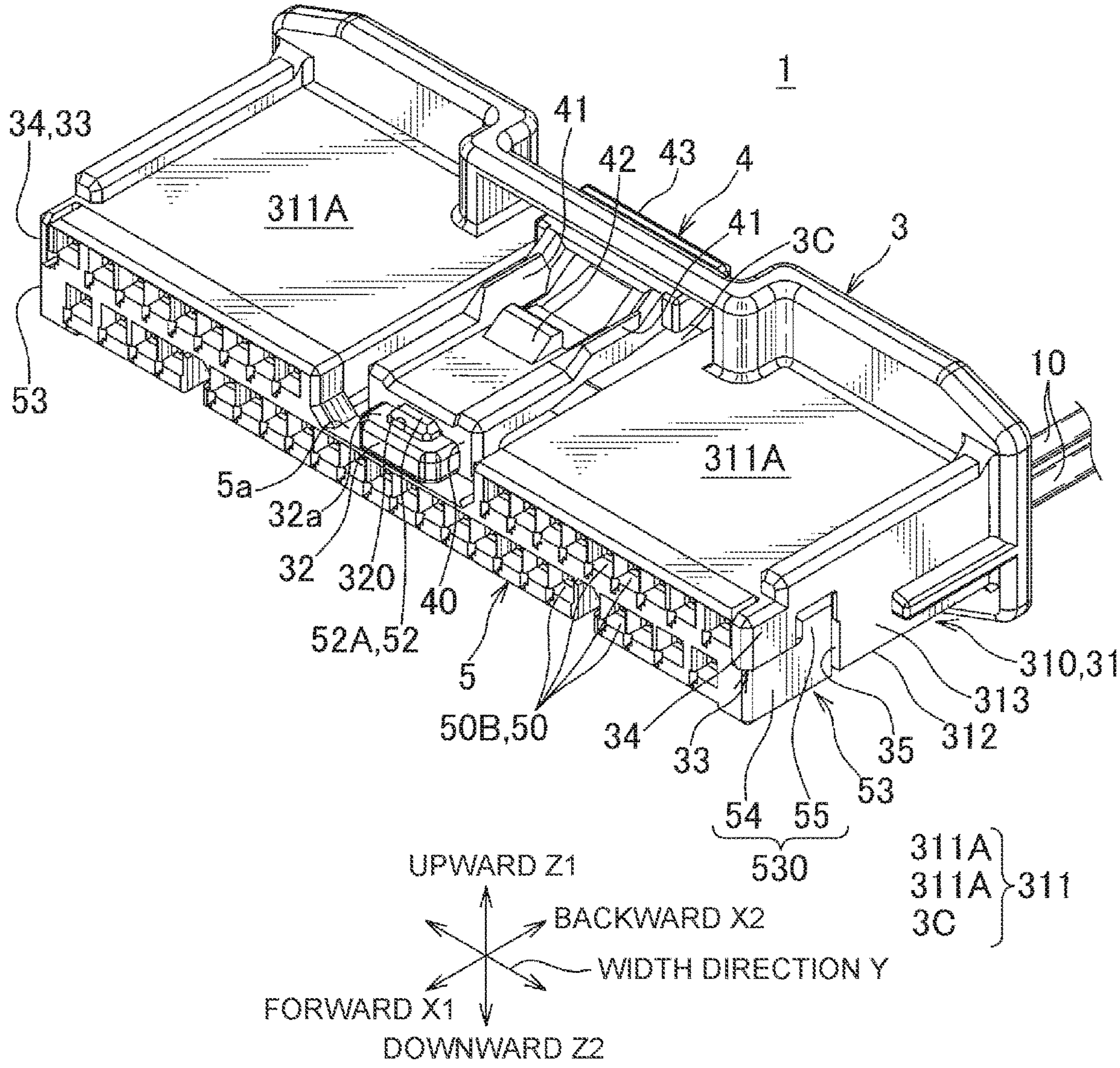
FIG. 1 is a perspective view illustrating a connector according to a first embodiment of the present invention.
Figure 2:
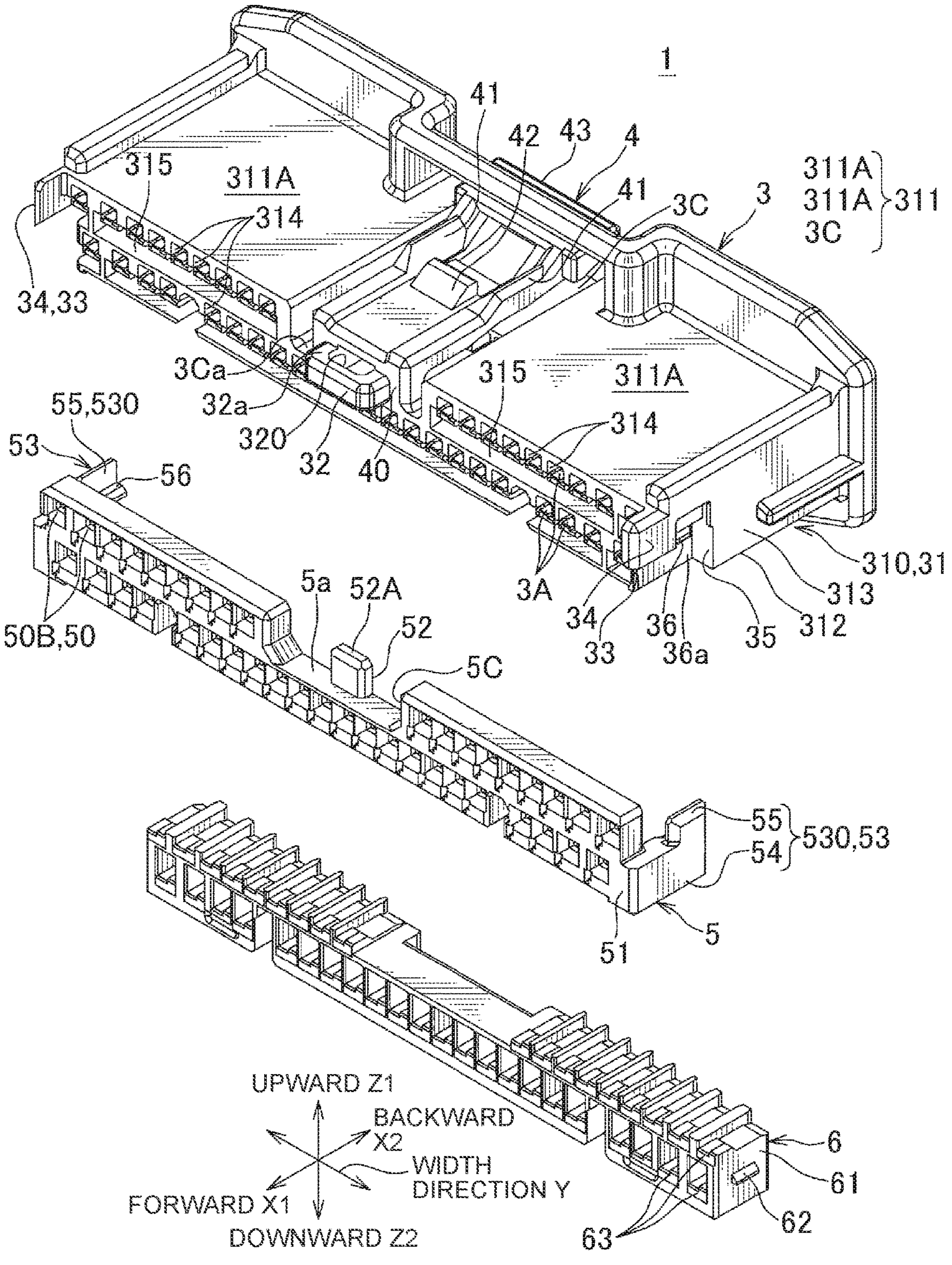
FIG. 2 is a perspective view illustrating a housing, a front mask and a spacer forming the connector.
Figure 3:
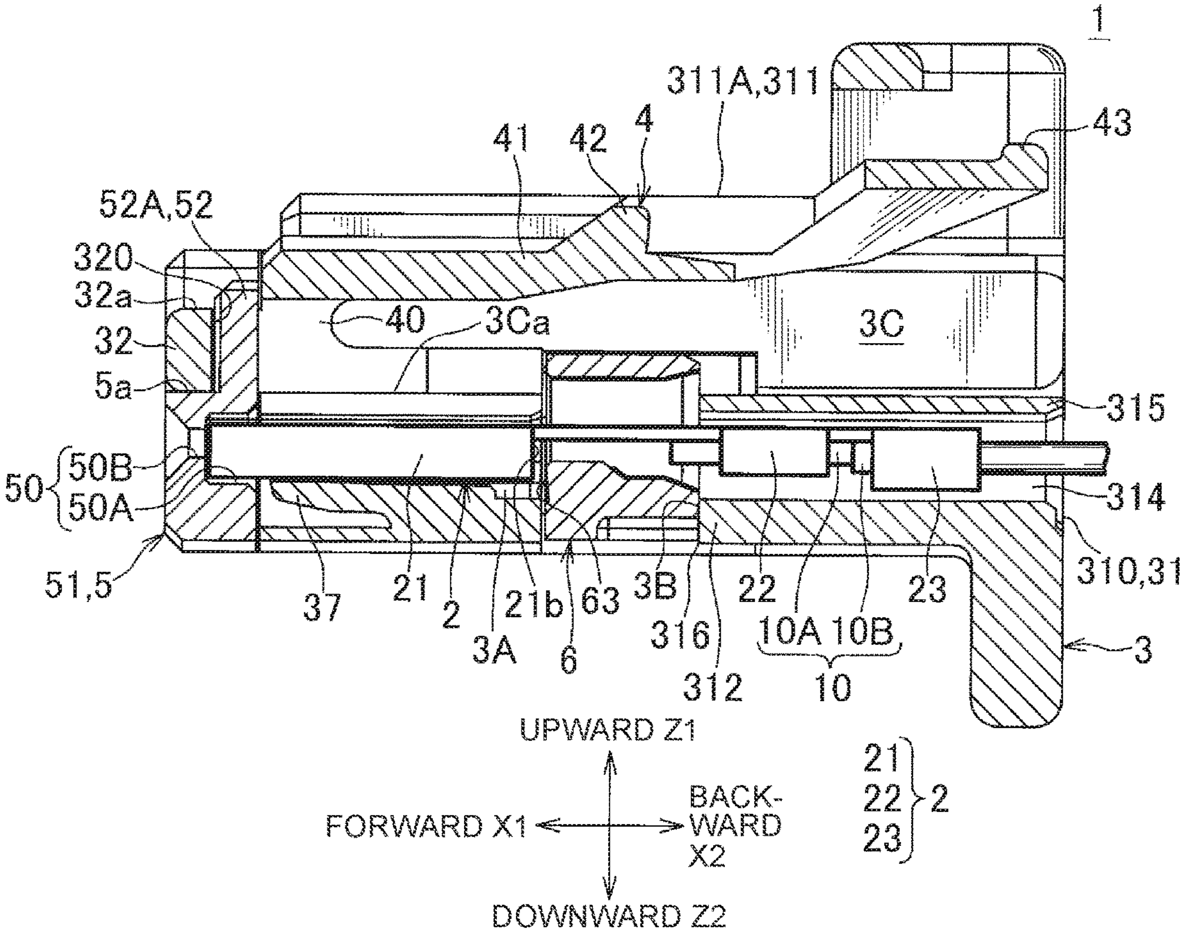
FIG. 3 is a sectional view illustrating the connector.

Hereinafter, a first embodiment of the present invention will be described with reference to FIGS. 1 to 4. FIG. 1 shows a perspective view illustrating a connector 1 according to a first embodiment of the present invention. FIG. 2 shows a perspective view illustrating a housing 3, a front mask 5 and a spacer 6 forming the connector 1. FIG. 3 shows a sectional view illustrating the connector 1.

As shown in FIGS. 1 and 3, the connector 1 according to the present embodiment includes female terminal metal parts 2 as a terminal according to the claims (hereinafter referred to as "female terminals 2", see FIG. 3), the housing 3, front mask 5 and a side spacer 6 (see FIG. 3), wherein the female terminals 2 are connected to electric wires 10, and the housing 3 includes terminal accommodating chambers 3A (see FIG. 3) for inserting the female terminals 2 therein. In the present embodiment, a terminal inserting direction in which the female terminals 2 are inserted may be referred to as "forward X1", a direction opposite thereto may be referred to as "backward X2", and two directions substantially orthogonal to a forward and backward direction X may be referred to as an up-down direction Z and a width direction Y. Further, one direction along the up-down direction Z may be referred to as "upward Z1", and a direction opposite thereto may be referred to as "downward Z2".

As shown in FIG. 3, the female terminals 2 are formed with an electrically conductive metal, and each have an electrical contact section 21, a core wire connecting section 22 and a coating connecting section 23, the electrical contact section 21 being configured to come into electrical contact a tab terminal of a partner connector (not shown), wherein the core wire connecting section 22 is configured to be connected to a core wire 10A of an electric wire 10 via crimping, and the coating connecting section 23 is configured to be connected to a coating section 10B of the electric wire 10 via crimping. The electrical contact section 21 has a quadrilateral-tubular shape which has an axis coincident with the forward and backward direction X. As shown in FIG. 3, the electrical contact section 21 is provided with a lance receiving portion (not shown) which is to be locked to a lance 37 of each of the terminal accommodating chambers 3A as described below. Such female terminals 2 are inserted into a forward X1 side by bringing front ends of the electrical contact sections 21 close to back ends of the terminal accommodating chambers 3A. It is further configured such that when the female terminals 2 have reached predetermined position in the terminal accommodating chambers 3A, tips of the female terminals 2 are accommodated in accommodating recesses 50A in the front mask 5 as shown in FIG. 3, wherein the lances 37 in the terminal accommodating chambers 3A lock the lance receiving portions. The accommodating recesses 50A will be described later. Furthermore, as shown in FIG. 3, the female terminals 2 are configured such that the back ends 21*b* of the electrical contact sections 21 are locked by terminal locking sections 63 of the side spacer 6 which will be described later. Such female terminals 2 each are primarily locked by the lance 37 in each of the terminal accommodating chambers 3A, and secondarily locked by each of the terminal locking sections 63 of the side spacer 6.

The housing 3 is formed e.g. from an insulating resin. As shown in FIG. 2, the housing 3 includes a housing main body 31, an engagement frame section 32 at the housing main body 31, a pair of counter-engaged portions 33, 33, and a lock arm section 4 which are integrated into the housing 3, the housing main body 31 having a housing recess 3C, wherein the engagement frame section 32 is configured to be engaged with an insertion protrusion 52 of the front mask 5 which will be described later, the pair of counter-engaged portions 33, 33 is configured to be engaged with a pair of engaged portions 53, 53 of the front mask 5 as described later, and the lock arm section 4 serves for maintaining a mated state with a partner housing of the partner connector.

As shown in FIGS. 2 and 3, the housing main body 31 includes a tubular region 310 with a quadrilateral-tubular shape, a plurality of width-direction partition walls 314, and a plurality of up-down-direction partition walls 315, the tubular region 310 being formed with an upper wall region 311, a lower wall 312 and a pair of lateral walls 313, 313 (see FIG. 2), wherein the width-direction partition walls 314 partition an inner space of the tubular region 310 in the width direction Y, and the up-down-direction partition walls 315 partition spaces in the up-down direction Z, wherein the spaces are obtained by partitioning the inner space with the width-direction partition walls 314. Furthermore, the housing main body 31 includes a plurality of terminal accommodating chambers 3A (see FIG. 3) and a spacer insertion space 3B for inserting the side spacer 6 therein (see FIG. 3), wherein the plurality of terminal accommodating chambers 3A is formed by partitioning the inner space with the above-described partition walls 314 and 315.

As shown in FIGS. 1 and 2, the upper wall region 311 includes a pair of wall portions 311A, 311A, and the housing recess 3C located between the pair of wall portions 311A, 311A. The housing recess 3C is located in the middle of the housing main body 31 in the width direction Y, and extends continuously in the forward and backward direction X. A bottom face 3Ca of the housing recess 3C (see FIG. 2) is located lower than upper surfaces of the pair of wall portions 311A, 311A, wherein the lock arm section 4 which will be described later is located within the housing recess 3C.

The up-down-direction partition walls 315 are arranged between the respective wall portions 311A and the lower wall 312, as shown in FIG. 2. As shown in FIG. 2, spaces which are obtained by partitioning the inner space with the width-direction partition walls 314 are further partitioned in the up-down direction by the up-down-direction partition walls 315, whereby the plurality of terminal accommodating chambers 3A is arranged in the width direction Y as well as in the up-down direction Z.

Each of the terminal accommodating chambers 3A is formed in a quadrilateral-tubular shape with an extending direction (axial direction of the tube) coincident with the forward and backward direction X, and configured to accommodate one of the female terminals 2, as shown in FIG. 3. Furthermore, as shown in FIG. 3, each of the terminal accommodating chambers 3A includes the lance 37 therein for locking the female terminal 2 accommodated in the corresponding terminal accommodating chamber 3A.

Figure 4:
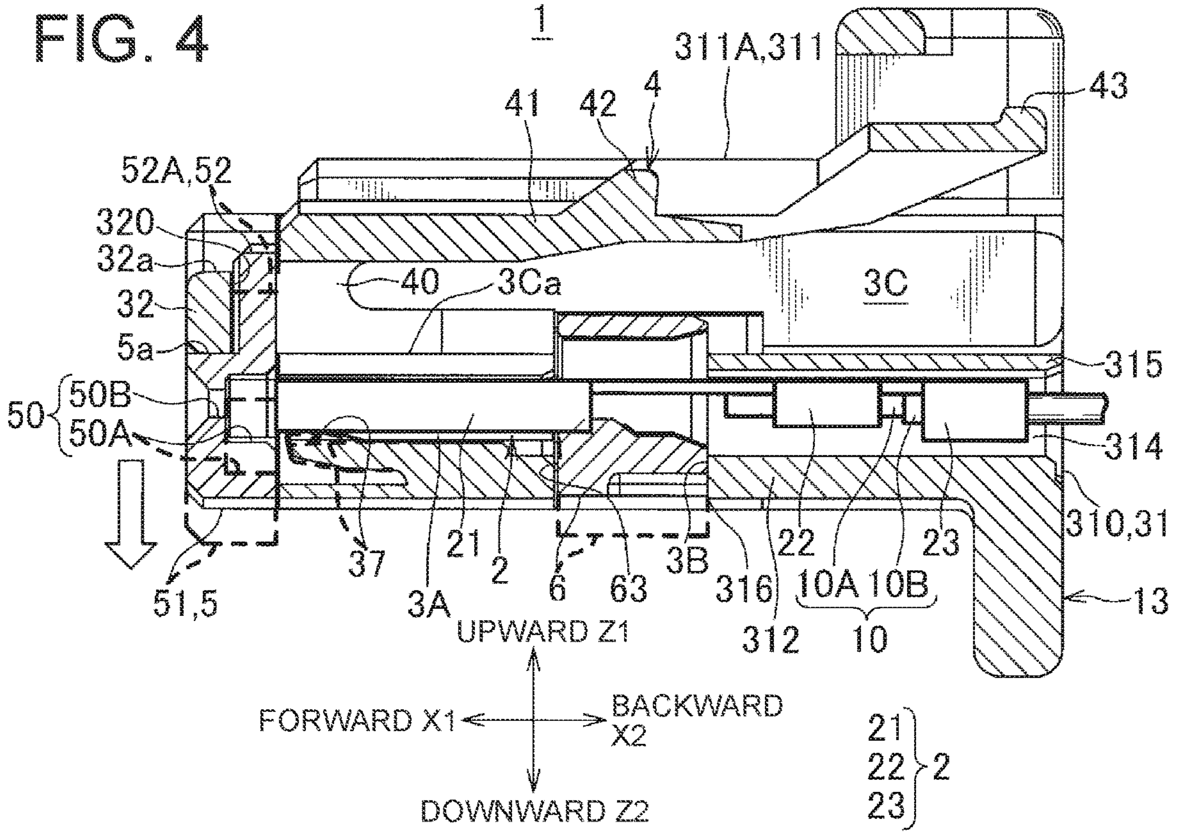
FIG. 4 is a view for explanation a case of incorrect assembly of the front mask to the housing.

Each of the lances 37 extends diagonally upward in the forward X1 direction in a natural state, as shown in FIGS. 3 and 4. The lances 37 are configured such that when inserting the female terminals 2 into the terminal accommodating chambers 3A, the female terminals 2 come into contact with the lances 37 and the lances 37 are thus primarily bent, wherein when the female terminals 2 are further inserted and reach their correct positions in the respective terminal accommodating chambers 3A, the lances 37 are returned to their original state to lock the lance receiving portions of the female terminals 2.

The spacer insertion space 3B is part of the plurality of terminal accommodating chambers 3A as shown in FIG. 3 which is cut out by removing a portion of each of the width-direction partition walls 314 and the up-down-direction partition walls 315 in the housing main body 31 so as to form one space which extends continuously in the width direction Y. As shown in FIG. 3, the spacer insertion space 3B has an opening 316 which is formed by cutting out a portion of the lower wall 312 of the housing main body 31 so that the side spacer 6 can be inserted into the spacer insertion space 3B through the opening 316.

Furthermore, the housing main body 31 includes temporary counter-locking portions and final counter-locking portions which are not shown, wherein the temporary counter-locking portions lock a pair of locked protrusions 62, 62 of the side spacer 6 as described later in a temporary locked position, and the final counter-locking portions lock the pair of locked protrusions 62, 62 in a final locked position.

The engagement frame section 32 is arranged so as to protrude forward X1 from a coupling section 40 of the lock arm section 4, as shown in FIGS. 2 and 3. The coupling section 40 will be described later. Inside the engagement frame section 32, an insertion hole 320 is formed which extends through the engagement frame section 32 in the up-down direction Z. The insertion hole 320 is configured to insert the insertion protrusion 52 of the front mask 5 therein which will be described later.

As shown in FIGS. 1 and 2, each of the counter-engaged portions 33 includes an opposite wall 34, a cut-out portion 35 and an engagement recess 36, wherein the opposite walls 34 are opposed to each other in the width direction Y to position the front mask 5 therebetween, and the cut-out portions 35 are formed by removing a portion of front ends of the respective lateral walls 313 to receive engaged portion main bodies 530 of the front mask 5 which will be described later, wherein each of the engagement recesses 36 is to be engaged with an engagement projection 56 of the front mask 5 which will be described later. The opposite walls 34 protrude forward X1 from the respective lateral walls 313. The engagement recesses 36 are formed in a concave groove shape in bottom faces 36*a* in the cut-out portions 35 (outer faces in the width direction Y).

The lock arm section 4 includes the coupling section 40, a pair of arms 41, 41, a locking protrusion 42 and an operating section 43 as shown in FIGS. 2 and 3, the coupling section 40 is raised from the bottom face 3Ca of the housing recess 3C, wherein the pair of arms 41, 41 is continuous with the coupling section 40 and extends backward X2, the locking protrusion 42 protrudes upward Z1 from a portion connecting the pair of arms 41, 41 in the width direction Y, and the operating section 43 is provided at back ends of the pair of arms 41, 41. This lock arm section 4 is configured such that when mating the housing 3 with the partner housing, the locking protrusion 42 is engaged with a locked portion of the partner housing. Furthermore, the locking protrusion 42 of the housing 3 and the locked portion of the partner housing are configured to be disengaged from each other by pushing down the operating section 43 and thereby bending the pair of arms 41, 41.

The front mask 5 includes a plate-shaped mask main body 51, the insertion protrusion 52 as the inserted portion according to the claims, and the pair of engaged portions 53, 53 as shown in FIGS. 2 and 3, the mask main body 51 having a plurality of terminal hole portions 50, wherein the insertion protrusion 52 is to be inserted into the insertion hole 320 in the engagement frame section 32 of the housing, and the pair of engaged portions 53, 53 extends backward X2 from the mask main body 51 and is to be engaged with the pair of counter-engaged portions 33 of the housing main body 31.

As shown in FIGS. 2 and 3, the mask main body 51 has the plurality of terminal hole portions 50 formed therein. As shown in FIG. 3, the terminal hole portions 50 are placed in positions facing the forward X1 side the respective terminal accommodating chambers 3A, wherein each of the terminal hole portions 50 has an accommodating recess 50A and a tab terminal insertion hole 50B, the accommodating recess 50A being placed on the forward X1 side of each terminal accommodating chamber 3A and configured to accommodate the tip of the female terminal 2, and the tab terminal insertion hole 50B being placed on the forward X1 side of the accommodating recess 50A and configured to insert a tab terminal of the partner connector therethrough. The tab terminal insertion hole 50B has a radial dimension which is smaller than a radial dimension of the accommodating recess 50A.

Furthermore, the mask main body 51 has a mask recess 5C in the middle of the mask main body 51 in the width direction Y as shown in FIG. 2, the mask recess 5C being formed by removing an upper end portion in the middle in the width direction Y, wherein the insertion protrusion 52 protrudes upward Z1 from a bottom face 5*a* of the mask recess 5C. In a state where the engaged portions 53 described later are engaged with the counter-engaged portions 33 of the housing main body 31 and the front mask 5 is assembled to the housing 3, the insertion protrusion 52 protrudes with a protrusion dimension with which an upper end 52A of the insertion protrusion 52 protrudes from an upper face 32*a* of the engagement frame section 32 and is exposed.

The pair of engaged portions 53, 53 has a pair of backward protruding elements 54, 54, upward protruding elements 55 and the engagement projections 56 as shown in FIG. 2, the pair of backward protruding elements 54, 54 protruding in a plate shape backward X2 from the mask main body 51 and the upward protruding elements 55 protruding upward Z1 from tips of the respective backward protruding elements 54, wherein the engagement projections 56 protrude inwardly from the respective backward protruding elements 54 in the width direction Y to be engaged with the engagement recesses 36 in the housing main body 31. In the following description, the backward protruding elements 54 and upward protruding elements 55 may be collectively referred to as "engaged portion main bodies 530". Such engaged portions 53 are provided such that the engaged portion main bodies 530 are fitted in the cut-out portions 35 in the counter-engaged portions 33 and the engagement projections 56 are engaged with the engagement recesses 36.

Here, as shown in FIG. 3, the following state shall be defined as a state where the front mask 5 is correctly assembled to the housing 3: in this state, the engagement recesses 36 in the housing main body 31 are engaged with the engagement projections 56 of the front mask 5 and the insertion protrusion 52 of the front mask 5 protrudes upward Z1 from the engagement frame section 32 of the housing main body 31 so that the upper end 52A of the insertion protrusion 52 is visible to an operator (hereinafter, this state may be referred to as a "correct state"). In this correct state, the terminal hole portions 50 of the mask main body 51 are positioned in the positions facing the forward X1 side of the respective terminal accommodating chambers 3A of the housing 3 so that the tips of the female terminals 2 are allowed to be inserted to reach the accommodating recesses 50A in the front mask 5.

As shown in FIG. 2, the side spacer 6 includes a spacer main body 61 with a cuboid-like shape and the pair of locked protrusions 62, 62, the spacer main body 61 being configured to be inserted into the spacer insertion space 3B in the housing main body 31, wherein the pair of locked protrusions 62, 62 protrudes in the width direction Y from the spacer main body 61. As shown in FIG. 2, the spacer main body 61 has partitions formed therein so that the partitions form part of the respective terminal accommodating chambers 3A, wherein the spacer main body 61 further includes the terminal locking sections 63 for locking the respective female terminals 2 accommodated in the respective terminal accommodating chambers 3A. The terminal locking sections 63 are arranged at a front end face of the spacer main body 61 as shown in FIG. 3, wherein the terminal locking sections 63 limit movement of the respective female terminals 2 in the backward X2 direction by locking the back ends 21*b* of the electrical contact sections 21 of the respective female terminals 2 when the spacer main body 61 is positioned in the final locked position as described later. This prevents the female terminals 2 from being removed from the respective terminal accommodating chambers 3A.

As shown in FIG. 2, the pair of locked protrusions 62, 62 are configured such that the spacer main body 61 is positioned in the temporary locked position by locking the locked protrusions 62, 62 to the temporary counter-locking portions of the housing 3, wherein the spacer main body 61 is positioned in the final locked position by locking the locked protrusions 62, 62 to the final counter-locking portions of the housing 3. In this manner, the spacer main body 61 is configured to be movable between the temporary locked position and the final locked position. Furthermore, when the side spacer 6 is located in the temporary locked position, the female terminals 2 are inserted into the terminal accommodating chambers 3A and reach predetermined positions in the terminal accommodating chambers 3A, wherein the terminal locking sections 63 lock the back ends 21*b* of the electrical contact sections 21 in the female terminals 2 by pushing the side spacer 6 inside from the temporary locked position to move to the final locked position, whereby the female terminals 2 are prevented by the spacer 6 from being removed from the terminal accommodating chambers 3A, as shown in FIG. 3.

Next, a procedure for assembling the connector 1 will be described with reference to FIGS. 2 and 3.

First, core wires of electric wires 11 are connected to the core wire connecting sections 22 of the female terminals 2 via crimping, and coating sections 11B of the electric wires 11 are connected to the coating connecting sections 23 of the female terminals 2 via crimping in advance. As shown in FIG. 3, the side spacer 6 is brought close to the opening 316 in the housing main body 31 and then inserted into the spacer insertion space 3B. The side spacer 6 is further inserted so that the pair of locked protrusions 62, 62 are locked to the temporary counter-locking portions of the housing 3 to position the side spacer 6 in the temporary locked position.

Next, as shown in FIG. 2, a tip of the insertion protrusion 52 is brought close to the insertion hole 320 in the housing 3 from below, with the mask main body 51 facing the front end face of the housing main body 31, and the insertion protrusion 52 is then inserted into the insertion hole 320. By further inserting the insertion protrusion 52, the engaged portion main bodies 530 of the engaged portions 53 are fitted in the cut-out portions 35 in the counter-engaged portions 33 and the engagement projections 56 are engaged with the engagement recesses 36. The terminal hole portions 50 in the mask main body 51 are thus located in the positions facing the forward X1 side of the respective terminal accommodating chambers 3A in the housing 3, as shown in FIG. 3. In this manner, the front mask 5 is assembled to the housing 3. In the state where the front mask 5 is assembled to the housing 3 as described above (correct state), the insertion protrusion 52 of the front mask 5 protrudes upward Z1 from the engagement frame section 32 of the housing 3 so that the upper end 52A of the insertion protrusion 52 is visible to an operator.

Subsequently, the front ends of the female terminals 2 are brought close to and inserted into the back ends of the respective terminal accommodating chambers 3A of the housing main body 31, as shown in FIG. 3. By further inserting the female terminals 2, their front ends come into contact with the lances 37 and primarily bend the lances 37. By further inserting the female terminals 2, the tips of the female terminals 2 are accommodated in the accommodating recesses 50A in the front mask 5 so that the lances 37 are returned to their original state to lock the female terminals 2 to the lances 37. In this manner, the female terminals 2 are accommodated in the respective terminal accommodating chambers 3A.

Thereafter, the side spacer 6 is further inserted into the spacer insertion space 3B in the housing main body 31, as shown in FIG. 3. By further inserting the side spacer 6, the pair of locked protrusions 62, 62 lock the final counter-locking portions of the housing 3 to position the side spacer 6 in the final locked position. The terminal locking sections 63 of the side spacer 6 then lock the back ends 21*b* of the electrical contact sections 21 of the female terminals 2 accommodated in the terminal accommodating chambers 3A so that the female terminals 2 are prevented from being removed from the respective terminal accommodating chambers 3A. In this manner, the connector 1 is assembled.

Here, although upon the side spacer 6 being allowed to be moved from the temporary locked position to the final locked position, the operator recognizes absence of error in the assembly process, the front mask 5 may be incorrectly assembled to the housing 3 at this time as shown in FIG. 4, i.e., the insertion protrusion 52 of the front mask 5 may not protrude upward Z1 from the engagement frame section 32 of the housing 3 and the upper end 52A of the insertion protrusion 52 may not be visible to the operator. In this case, the tips of the female terminals 2 come into contact with circumferential edges of the accommodating recesses 50A in the front mask 5 so that the female terminals 2 cannot reach the predetermined position in the terminal accommodating chambers 3A. At this time, the operator can recognize incorrect assembly of the front mask 5 to the housing 3, however, e.g. when the operator overlooks this and pushes the side spacer 6 from the temporary locked position, the side spacer 6 comes into contact with the female terminals 2 so that the side spacer 6 cannot be moved from the temporary locked position to the final locked position. In other words, when the front mask 5 is incorrectly assembled to the housing 3, movement of the side spacer 6 is limited so that it is ensured that the operator can recognize the incorrect assembly of the front mask 5 to the housing 3.

The embodiment as described above provides the terminals 2, the housing 3 and the front mask 5, the housing 3 including the terminal accommodating chambers 3A for inserting the terminals 2 therein, and the front mask 5 being configured to cover a front side of the housing 3 on the forward X1 side (terminal inserting direction) in which the terminals 2 are inserted into the housing 3, wherein the housing 3 includes the housing main body 31 and the engagement frame section 32, the housing main body 31 including the terminal accommodating chambers 3A, wherein the engagement frame section 32 protrudes forward X1 from the housing main body 31, wherein the front mask 5 includes the mask main body 51 and the insertion protrusion 52 (inserted section), the mask main body 51 being provided with the accommodating recesses 50A in positions of the mask main body 51 facing the terminal accommodating chamber 3A, wherein the insertion protrusion 52 is configured to be inserted inside the engagement frame section 32, and wherein in the state in which the insertion protrusion 52 is inserted inside the engagement frame section 32 and the accommodating recesses 50A are located in the positions facing the terminal accommodating chambers 3A, the upper end 52A of the insertion protrusion 52 (portion of the inserted section) protrudes from the engagement frame section 32 and is exposed. This enables the operator to recognize correct assembly of the front mask 5 to the housing 3 by visually recognizing that the insertion protrusion 52 protrudes from the engagement frame section 32 and the upper end 52A of the insertion protrusion 52 is exposed. In this manner, after recognizing that front mask 5 is correctly assembled to the housing 3, the operator inserts the female terminals 2 into the respective terminal accommodating chambers 3A in the housing 3, whereby it is allowed to insert the tips of the female terminals 2 to reach the accommodating recesses 50A in the front mask 5. Since it is thus possible to eliminate repeated operations by proceeding with the assembling operations under the operator's recognition that the front mask 5 is correctly assembled to the housing 3, it may be allowed to improve the operability for assembling.

The present embodiment further provides the side spacer 6 (spacer) configured to be inserted into the housing 3, wherein the side spacer 6 is configured to be locked in the housing 3 in the temporary locked position and the final locked position of the housing 3, the final locked position being located further upward Z1 (deeper in the housing 3 in the inserting direction) than the temporary locked position, wherein the female terminals 2 are configured to be inserted into the terminal accommodating chambers 3A with the side spacer 6 being located in the temporary locked position, and wherein the connector 1 is configured such that the female terminals 2 are prevented from being removed out of the housing 3 by the side spacer 6 via pushing the side spacer 6 to the final locked position from the temporary locked position. In this manner, based on the fact that the side spacer 6 is allowed to be moved to the final locked position from the temporary locked position, the operator can proceed with assembling operations under recognition that the female terminals 2 have reached the predetermined positions in the terminal accommodating chambers 3A.

Second Embodiment

Figure 5:
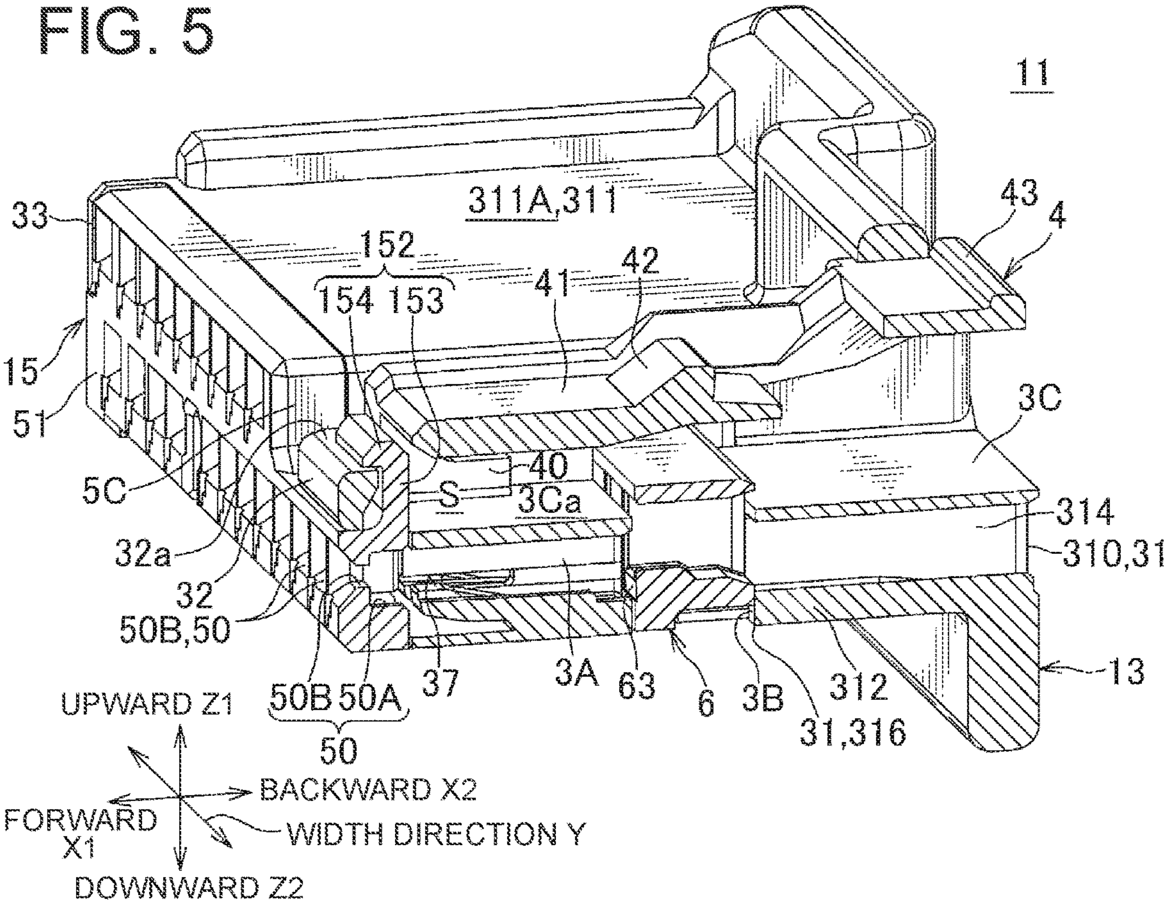
FIG. 5 is a perspective view of a connector according to a second embodiment of the present invention, with a partial sectional view thereof.
Figure 6:
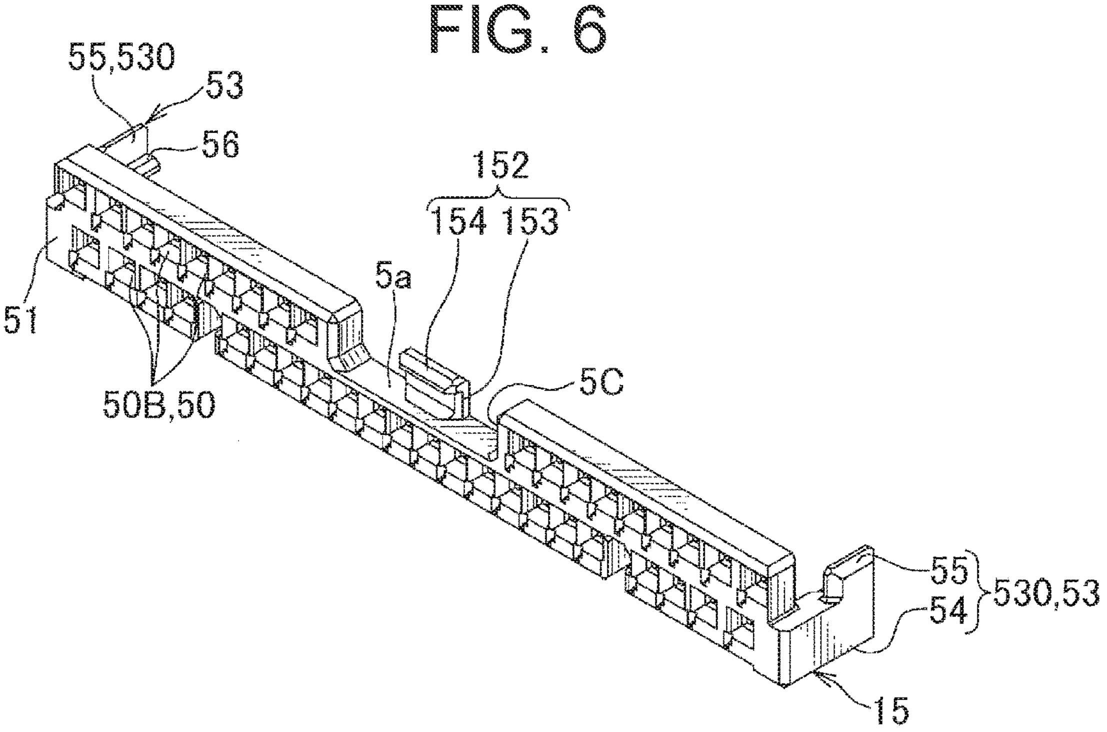
FIG. 6 is a perspective view illustrating a front mask forming part of the connector.
Figure 7:
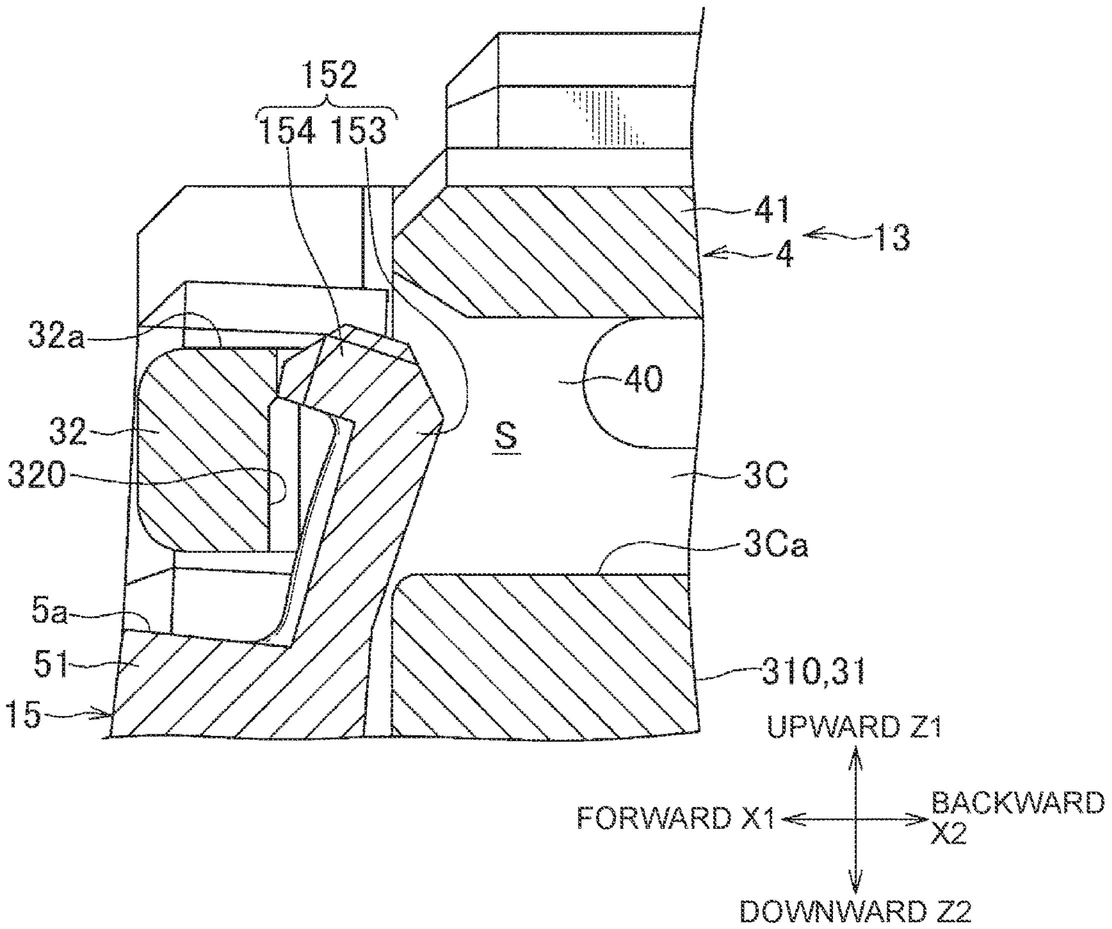
FIG. 7 is a sectional view illustrating how the front mask is assembled to a housing.

Hereinafter, a second embodiment of the present invention will be described with reference to FIGS. 5 to 7. FIG. 5 shows a perspective view of a connector 11 according to the second embodiment of the present invention, with a partial sectional view thereof. FIG. 6 shows a perspective view illustrating a front mask 15 forming part of the connector 11. FIG. 7 shows a sectional view illustrating how the front mask 15 is assembled to a housing 13. It is to be noted that in FIG. 5, female terminals 2 and electric wires 10 are omitted.

As shown in FIGS. 5 and 6, the connector 11 according to the present embodiment includes female terminal metal parts 2 as a terminal 2 according to the claims (hereinafter referred to as "female terminals 2", see FIG. 5), the housing 13, front mask 15 and a side spacer 6 (see FIG. 5), wherein the female terminals 2 are connected to electric wires 10, and the housing 13 includes terminal accommodating chambers 3A for inserting the female terminals 2 therein. In the following description, components having the same features are designated with the same reference signs as those in the first embodiment, and their detailed description will be omitted.

As shown in FIGS. 5 and 7, the housing 13 has a bending space S which is defined by a coupling section 40 and a pair of arms 41, 41 and configured to allow an insertion arm 152 of the front mask 15 to enter the bending space S. The insertion arm 152 will be described later.

The front mask 15 includes a rectangular-plate-shaped mask main body 51, the insertion arm 152 as the inserted portion according to the claims, and the pair of engaged portions 53, 53 as shown in FIGS. 5 and 6, the mask main body 51 having a plurality of terminal hole portions 50, wherein the insertion arm 152 is to be inserted into and engaged with the insertion hole 320 in the engagement frame section 32 of the housing 13, and the pair of engaged portions 53, 53 extends backward X2 from the mask main body 51 and is to be engaged with the pair of counter-engaged portions 33 of the housing 13 (see FIG. 6).

As shown in FIGS. 5 to 7, the insertion arm 152 includes an inserted section main body 153 and an engagement claw 154 as a portion of the inserted section according to the claims, the inserted section main body 153 being configured to be inserted inside the engagement frame section 32, wherein the engagement claw 154 is disposed on a free end side of the inserted section main body 153 and configured to be engaged with the engagement frame section 32 of the housing main boy 31. The inserted section main body 153 protrudes upward Z1 from a bottom face 5Ca of a mask recess 5C as shown in FIG. 6, and is configured to be elastically deformable in a forward and backward direction X. This engagement claw 154 protrudes forward X1 from a free end (tip) of the inserted section main body 153, and is configured to be engageable with an upper face 32*a* of the engagement frame section 32. As shown in FIG. 5, the insertion arm 152 is configured such that in a state where the engaged portions 53 are engaged with the counter-engaged portions 33 of the housing main body 31 and the front mask 15 is assembled to the housing 13, the engagement claw 154 protrudes from the upper face 32*a* of the engagement frame section 32 and is exposed.

For engaging such an insertion arm 152 with the engagement frame section 32, the engagement claw 154 of the insertion arm 152 is brought close to the engagement frame section 32 of the housing main body 31 from below and moved upward Z1, with the mask main body 51 facing the front end face of the housing main body 31, as shown in FIG. 7. By further moving the engagement claw 154, it comes int contact with a lower end face of the engagement frame section 32 of the housing main body 31 so that the inserted section main body 153 is primarily bent and enters the bending space S. By further moving the engagement claw 154, it reaches an inner surface of the engagement frame section 32 and crosses across it so that the inserted section main body 153 is returned to its original state to engage the engagement claw 154 with the upper face 32*a* of the engagement frame section 32. In this manner, the insertion arm 152 is engaged with the engagement frame section 32. In the state where the insertion arm 152 is engaged with the engagement frame section 32, the engagement claw 154 of the front mask 15 protrudes upward Z1 from the engagement frame section 32 of the housing 13 so that the engagement claw 154 is visible to an operator.

According to the embodiment as described above, the insertion arm 152 of the front mask 15 (inserted section) includes the inserted section main body 153 and the engagement claw 154 (portion of the inserted section), the inserted section main body 153 being configured to be inserted inside the engagement frame section 32, wherein the engagement claw 154 is disposed at the inserted section main body 153 and configured to be engaged with the engagement frame section 32. This enables the operator to recognize correct assembly of the front mask 15 to the housing 13 by visually recognizing that the engagement claw 154 protrudes from the upper face 32*a* of the engagement frame section 32 and the engagement claw 154 is exposed. In addition, engagement of the engagement claw 154 with the engagement frame section 32 of the housing 13 enables the front mask 15 to be prevented from being removed.

In the present embodiment, the mask main body 51 may be deformed downward Z2 in the middle in the width direction Y after molding, which is caused due to forming the mask main body 51 with a long dimension in the width direction Y. In this case, when the front mask 15 has been assembled to the housing 13, the tips of the female terminals 2 may come into contact with circumferential edges of the respective accommodating recesses 50A of the front mask 15 which may make it difficult to insert the tips of the female terminals 2 to reach the accommodating recesses 50A in the front mask 15. However, the deformation of the front mask 15 can be corrected to eliminate it by engaging the engagement claw 154 of the insertion arm 152 with the upper face 32*a* of the engagement frame section 32, so that the tips of the female terminals 2 are allowed to be inserted to reach the accommodating recesses 50A in the front mask 15. This may enable the operability for assembling to be still further improved.

It is to be noted that although reference is made to the female terminals 2 as an example for the terminal according to the claims in the above description of the embodiments, the present invention is not limited thereto. The scope of the present invention shall include an inserted member such as an inner connector in the prior art as the terminal.

Although the best configuration, method etc. for implementing the present invention are disclosed in the above description, the present invention is not limited thereto. Namely, while the present invention is particularly shown and described mainly with regard to the specific embodiments, the above mentioned embodiments may be modified in various manners in shape, material characteristics, amount or other detailed features by those skilled in the art without departing from the scope of the technical idea and purpose of the present invention. Therefore, the description with limited shapes, material characteristics etc. according to the above disclosure is not limiting the present invention, but merely illustrative for easier understanding the present invention so that the description using names of the elements without a part or all of the limitations to their shapes, material characteristics etc. is also included in the present invention.

REFERENCE SIGNS LIST

11, 1 Connector
2 Female terminals (terminals)
3, 13 Housing
3A Terminal accommodating chambers
31 Housing main body
32 Engagement frame section
5, 15 Front mask
6 Side spacer (spacer)
50A Accommodating recesses
51 Mask main body
52 Inserted section
52A Upper end of the inserted section (portion of the inserted section)
152 Insertion arm (inserted section)
153 Inserted section main body
154 Engagement claw (portion of the inserted section)
X1 Forward (terminal inserting direction)

What is claimed is:

1. A connector comprising:

a housing including a terminal accommodating chamber for inserting a terminal therein; and a front mask configured to cover a front side of the housing in a terminal inserting direction along which the terminal is inserted into the housing, wherein the housing includes a housing main body and an engagement frame section, the housing main body including the terminal accommodating chamber and a pair of counter engagement recesses, wherein the engagement frame section protrudes forward from the housing main body, wherein the engagement frame section comprises a through hole along a direction intersecting the terminal inserting direction, wherein the front mask includes a mask main body and an inserted section, the mask main body being provided with an accommodating recess in a position of the mask main body facing the terminal accommodating chamber and a pair of engagement protrusions, wherein the inserted section is configured to be inserted inside the through hole of the engagement frame section, and wherein in a state in which the inserted section is inserted inside the through hole of the engagement frame section and the accommodating recess is located in a position facing the terminal accommodating chamber, a portion of the inserted section extends beyond the through hole of the engagement frame section and is exposed along the direction intersecting the terminal inserting direction, and the pair of engagement protrusions engage with the pair of counter engagement recesses.

2. The connector according to claim 1, further comprising:

a spacer configured to be inserted into the housing, and a terminal, wherein the spacer is configured to be locked in the housing in a temporary locked position and a final locked position of the housing, the final locked position being located deeper in the housing in an inserting direction than the temporary locked position, wherein the terminal is configured to be inserted into the terminal accommodating chamber with the spacer being located in the temporary locked position, and wherein the connector is configured such that the terminal is prevented from being removed out of the housing by the spacer via pushing the spacer to the final locked position from the temporary locked position.

3. The connector according to claim 2, wherein the inserted section includes an inserted section main body and an engagement claw, the inserted section main body being configured to be inserted inside the through hole of the engagement frame section, wherein the engagement claw is disposed at the inserted section main body and configured to be engaged with the engagement frame section.

4. The connector according to claim 1, wherein the inserted section includes an inserted section main body and an engagement claw, the inserted section main body being configured to be inserted inside the through hole of the engagement frame section, wherein the engagement claw is disposed at the inserted section main body and configured to be engaged with the engagement frame section.

5. The connector according to claim 1, wherein the pair of engagement protrusions respectively comprise an upward projection, and wherein the pair of counter engagement recesses respectively comprise an upward cut-out section corresponding to the upward projections of the pair of engagement protrusions.

6. The connector according to claim 1, wherein the pair of counter engagement recesses respectively comprise an L-shape cut-out and are provided on outer portions of the housing main body, and wherein the pair of engagement projections respectively comprise an L-shape projection corresponding to the L-shape cut-out of the pair of counter engagement recesses and are provided on outer portions of the mask main body.

7. The connector according to claim 1, wherein the direction intersecting the terminal inserting direction is an upward direction.

8. The connector according to claim 1, wherein the pair of counter engagement recesses are respectively provided on outer portions of the housing main body, and wherein the pair of engagement protrusions are respectively provided on outer portions of the mask main body.

* * * * *